(12) United States Patent
Clapper

(10) Patent No.: US 8,181,204 B2
(45) Date of Patent: May 15, 2012

(54) LINKING TO VIDEO INFORMATION

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 1201 days.

(21) Appl. No.: 11/998,751

(22) Filed: Nov. 30, 2007

(65) Prior Publication Data

US 2008/0089659 A1    Apr. 17, 2008

Related U.S. Application Data

(63) Continuation of application No. 09/409,128, filed on Sep. 30, 1999, now Pat. No. 7,325,245.

(51) Int. Cl.
*H04N 5/445* (2011.01)
*H04N 7/173* (2011.01)

(52) U.S. Cl. .............. 725/54; 725/37; 725/39; 725/109; 725/112

(58) Field of Classification Search .................... 725/37, 725/54, 109, 112
See application file for complete search history.

(56) References Cited

U.S. PATENT DOCUMENTS

| | | | |
|---|---|---|---|
| 5,134,499 A | 7/1992 | Sata et al. | |
| 5,479,302 A | 12/1995 | Haines | |
| 5,548,532 A * | 8/1996 | Menand et al. | 370/477 |
| 5,563,648 A | 10/1996 | Menand et al. | |
| 5,610,653 A | 3/1997 | Abecassis | |
| 5,708,845 A | 1/1998 | Wistendahl et al. | |
| 5,768,539 A * | 6/1998 | Metz et al. | 709/249 |
| 5,815,146 A * | 9/1998 | Youden et al. | 715/720 |
| 5,918,012 A * | 6/1999 | Astiz et al. | 709/217 |
| 5,961,603 A | 10/1999 | Kunkel et al. | |
| 5,973,684 A | 10/1999 | Brooks et al. | |
| 5,978,855 A | 11/1999 | Metz et al. | |
| 5,982,362 A * | 11/1999 | Crater et al. | 715/719 |
| 5,999,970 A | 12/1999 | Krisbergh et al. | |
| 6,002,394 A * | 12/1999 | Schein et al. | 725/39 |
| 6,006,265 A * | 12/1999 | Rangan et al. | 709/226 |
| 6,035,304 A | 3/2000 | Machida et al. | |
| 6,137,484 A | 10/2000 | Hoddie et al. | |
| 6,480,667 B1 | 11/2002 | O'Connor | |

FOREIGN PATENT DOCUMENTS

| | | |
|---|---|---|
| JP | 06295312 | 10/1994 |
| JP | 11174950 | 7/1999 |
| WO | WO 97/37497 | 10/1997 |

(Continued)

OTHER PUBLICATIONS

"Hitachi Plans Flexible DVD Video Recorder", Electronic Engineering Times, p. 8, Jun. 16, 1997.

(Continued)

*Primary Examiner* — Kieu Oanh T Bui
(74) *Attorney, Agent, or Firm* — Trop, Pruner & Hu, P.C.

(57) ABSTRACT

A system enables dynamic linking between a variety of video formats including television broadcasts, web pages, and video displays which are stored on magnetic or optical media. Each frame of the video information is identified together with a plurality of locations within that frame. The locations selected by the user for example using a pointing device is then used to access associated information either within the system itself or on an external system. Thus, in some embodiments of the present invention, any item on a given frame may be linked initially or thereafter to other information within or without the particular system containing that information.

34 Claims, 5 Drawing Sheets

FOREIGN PATENT DOCUMENTS

| | | |
|---|---|---|
| WO | WO 98/17064 | 4/1998 |
| WO | WO 98/48566 | 10/1998 |
| WO | WO 99/34599 | 7/1999 |

OTHER PUBLICATIONS

Burrill et al., Time-Varying Sensitive Regions in Dynamic Multimedia Objects: A Pragmatic Approach to Content-Based Retrieval From Video, Information & Software Technology, Oxford, GB, vol. 26, No. 4, 1994, pp. 213-223.

IBM Corp., Multimedia Hypervideo Links for Full Motion Videos, IBM Technical Disclosure Bulletin, New York, vol. 37, No. 4A, Apr. 1994, p. 95.

* cited by examiner

_US 8,181,204 B2_

LINKING TO VIDEO INFORMATION

CROSS-REFERENCE TO RELATED APPLICATION

This application is a continuation of U.S. patent application Ser. No. 09/409,128, filed Sep. 30, 1999 now U.S. Pat. No. 7,325,245.

BACKGROUND

This invention relates generally to linking information displayed on a video display to additional information.

Hyperlinks (also called anchors or hotspots) are video display locations which a user can select to access a document or a web site (i.e. a collection of documents). Generally, a given document such as a hypertext markup language (HTML) document may have a hyperlink programmed onto the web page by indicating a given location displayed on the web page. When the user operates a pointing device on the designated embedded linking area, additional information may be accessed. Conventionally the embedded linked area is accessed by highlighting the linked area and operating a mouse button while a cursor or highlighting is arranged to point to the hyperlinked site.

The additional information may be additional video information, textual information, a web page or any of a variety of other information. A uniform resource locator (URL) is used to access the additional information. Absolute URLs locate external sites and relative URLs point to locations on the same web site or document.

Of course, the hyperlink works because the web page is programmed to include the embedded pointer. Thus, the hyperlinks become part of the code which defines the web page. The hyperlinks can be URLs or images which have associated URLs.

Because the hyperlinks are hard coded into the web page, once the hyperlinks are defined, it is relatively difficult to change them. Thus, if a given hyperlink points to a given source such as a web page, it generally will always point to that source unless the HTML code is rewritten.

In a number of circumstances, it would be desirable to enable the linking software to be redefined over time. Thus, at one time interval, when a user selects (or mouse clicks on) a given icon on a web page, one thing would happen and at another time a different thing would happen. This would allow greater flexibility and enables the web page creator to link to different sites at different times. For example the web page owner may sell the hyperlinks to different users at different times.

In conventional magnetic or optical media such as hard disks, magnetic tape, compact disks, digital video disks (DVD), and floppy disks, hyperlinking is generally not utilized. However, it would be desirable to enable reprogrammable hyperlinks from a variety of media including media storing video presentations such as movies.

Thus, there is a continuing need for better ways to link video information to other information in a way which may be readily reprogrammed and which is sufficiently flexible to enable additional information to be linked to information in a video presentation at various times.

SUMMARY

In accordance with one aspect, a method of linking information to video information includes linking the video information with other information based on the location of the video information on a frame and a frame identifier. The other information may be accessed in response to a user selection of a frame location.

Other aspects are set forth in the accompanying detailed description and claims.

DETAILED DESCRIPTION

Figure 1:
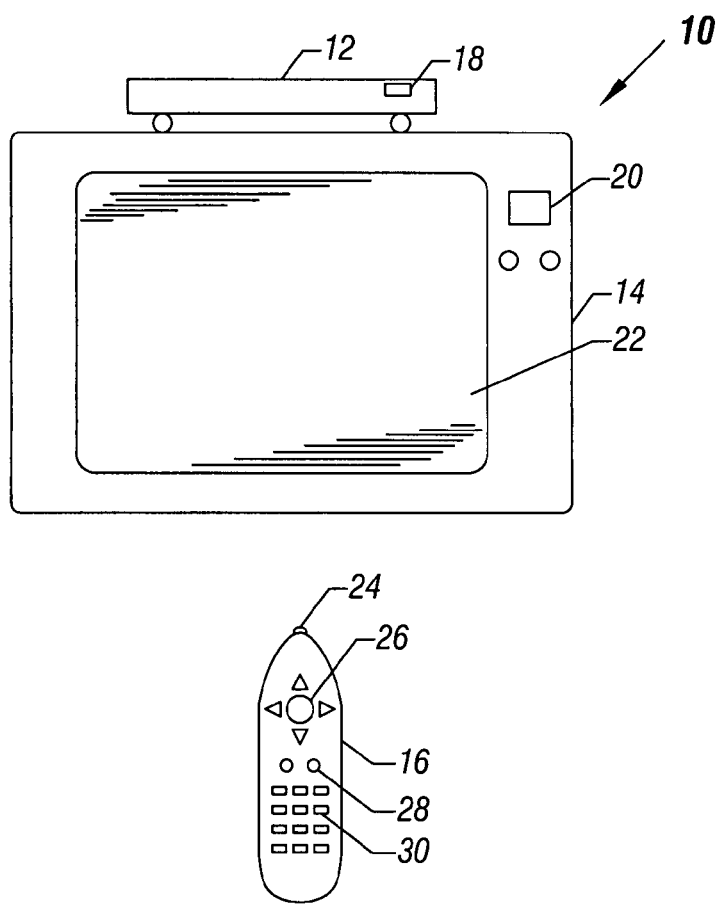
FIG. 1 is a front elevational view of one embodiment of the present invention.

A computer system 10 may include a processor-based unit 12 coupled to a display 14 such as a conventional television receiver having a display screen 22. A remote control unit (RCU) 16 may be utilized to remotely control the unit 12 and the display 14. Thus, in accordance with one embodiment of the present invention, mouse style commands may be produced by operating the directional buttons 26 to move a cursor image or highlighting on the display screen 22 to implement a conventional pointing function.

The RCU 16 may be an airwave transceiver 24 which communicates with transceivers 18 on the units 12 and 20. In this way, airwave communications may be undertaken between the components. The user can then control each component by providing input commands through the cursor controls 26, the pushbuttons 28 or the keypad 30.

While the present invention has been illustrated in connection with a processor-based unit 12 which may be called a set top computer system, the present invention is applicable to any of a variety of processor-based systems including desktop computers, laptop computers, and processor-based appliances, as additional examples.

The RCU 16 may conveniently generate and receive airwave signals such as infrared, radiowave or ultrasonic signals. While the present invention is illustrated in connection with a processor-based system 10 which uses an RCU 14 as a pointing device, the present invention is equally applicable to processor-based systems which are controlled using other pointing devices including a mouse, a rollerball, or a touchpad, as additional examples.

Figure 2:
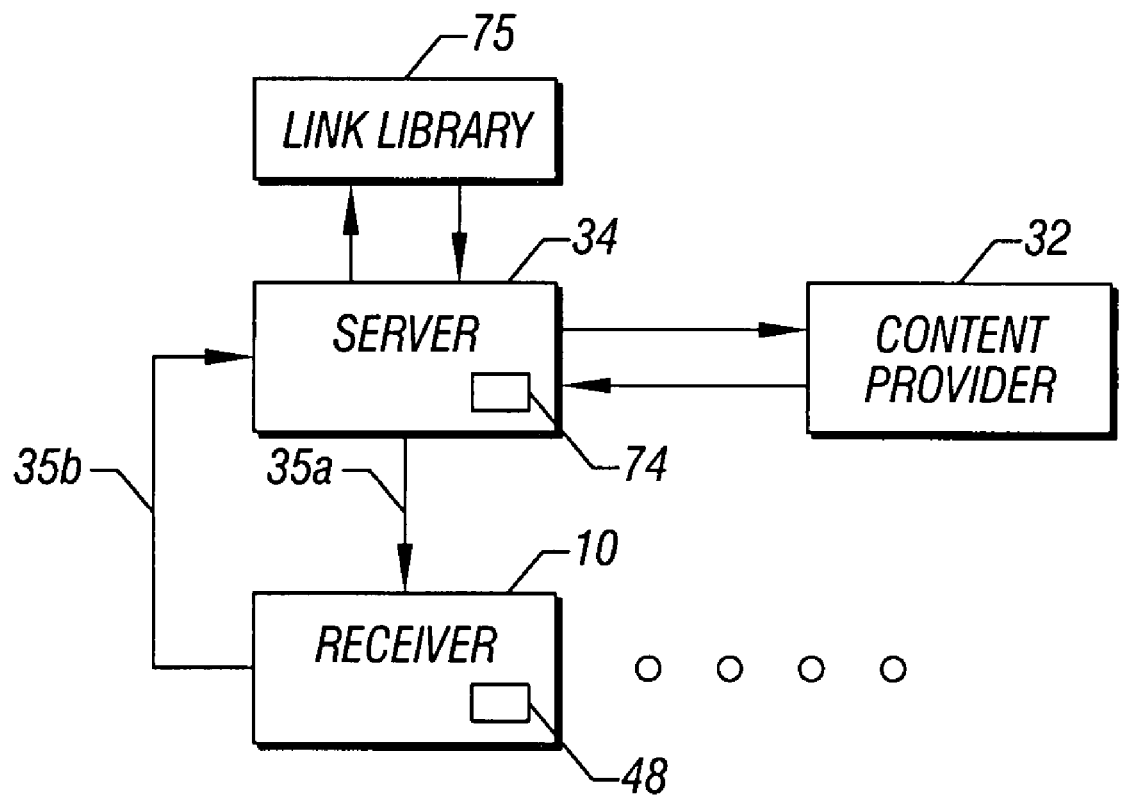
FIG. 2 is a schematic depiction of one implementation of the present invention.

In accordance with one embodiment of the present invention, the system 10 may be one of a plurality of similar receivers 10, shown in FIG. 2, which receive video transmissions (indicated by the arrow 35a) from a server 34. Each receiver 10 may communicate through a back channel 35b, in accordance with one embodiment of the present invention, with the server 34. Thus, as illustrated, two-way communications may be implemented between the server 34 and each of the plurality of receivers 10.

The server 34 may receive video content such as television programming from a content provider 32. The server 34 may also send communications to the content provider 32. In addition, the server 34 may communicate in a two-way communication protocol with a link library 75 in accordance with one embodiment of the present invention.

In one example of an implementation of the present invention, television programming may be transmitted from the server 34 to each of a plurality of receivers 10. At each receiver 10, a pointing device may be utilized to select a particular location in a particular video frame in order to access additional information. The selection may be transmitted over the back channel 35*b* from a receiver 10 to a server 34. In response, the server 34 may access the link library 75 to provide additional information corresponding to the particular location and the particular frame selected by the user of a receiver 10. That information may then be transmitted, for example as indicated by the arrow 35*a*, from the server to the receiver 10. Alternatively, the additional information may be obtained from the content provider 32.

A variety of transport media may be utilized to convey the additional information. For example, telephone, cable, satellite, and networked connections, including Internet connections, may be utilized to implement the transport media.

While the embodiment illustrated in FIG. 2 involves a video transmission system such as a television broadcasting system, the present invention is in no way limited to broadcast applications. It may likewise be applicable to any of a variety of transmissions involving visual information including video transmissions, movie distribution systems, or Internet web pages, as additional examples.

In accordance with still another embodiment of the present invention, a medium 70 may be provided which contains video information. The medium 70 may be, as examples, a floppy disk, a hard disk, a compact disk, a digital video disk, or any of a variety of optical or magnetic media. The medium 70 may store one or more video images which may be displayed on a conventional processor-based system. The processor-based system may also include a system memory 72 which may store a variety of programs which may be executed on the processor-based system.

When the user selects a given location and frame of an image currently being displayed on the system, the system memory 72 may record the selected location and its frame. The memory 72 may access associated information, which is stored on the medium 70, to display additional information, in accordance with one embodiment of the present invention. The nature of additional information is essentially boundless and is defined only as information which is linked by design to a given location in a given frame in the content originally stored on the medium 70.

Figure 3:
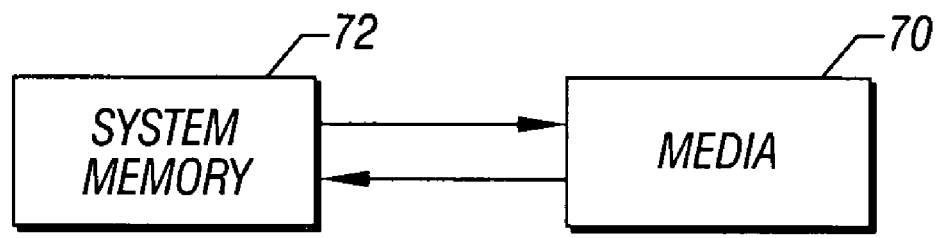
FIG. 3 is a schematic depiction of another embodiment of the present invention.

In the embodiments illustrated in FIGS. 2 and 3, video data may define a video frame or a plurality of video frames. Each video frame may be identified (if more than one video frame is involved) by a frame identifier. The frame identifier identifies each frame of a plurality of video frames which, for example, may make up a video presentation such as a movie, a television program, or a web site as examples. In addition, a plurality of locations on a given frame may be identified relative to other frames. Thus, when the user selects a given location and a given frame, that location and the identified frame itself provide an indication of the focus of a given user. The given location on a given frame may be linked through the active media (or through other media) with additional information which may be associated with the selected location.

One convenient frame identifier is the time code in accordance with one of a variety of industry standards including the Society of Motion Picture and Television Engineers (SMPTE). Conventionally, the time codes are utilized to enable synchronization between audio and video tracks. The SMPTE time code synchronization system is a biphase mark longitudinal time code (LTC) which can be recorded onto the audio track of a video tape in one example.

Another time code is the vertical interval time code (VITC). The VITC may be advantageous in some applications because it can be read even when the medium storing the video is paused.

The SMPTE time code is a broadcast standard time which may be recorded in the format HH:MM:SS;FF, where FF is a frame number between 00 and 29, HH is a two-digit code for hours, MM is a two-digit code for minutes and SS is a two-digit code for seconds. Assuming a frame rate of 30 frames per second, the SMPTE time code may identify every frame of a video sequence such as a movie, a television program or other video information.

While the present invention, in one embodiment, uses a time code to identify a given frame, the present invention is in no way limited to the use of time codes. The time code is simply a convenient way to identify one of a plurality of frames. Any other technique may also be utilized to identify each of the frames including simply providing each frame with a sequential identifier.

Figure 4:
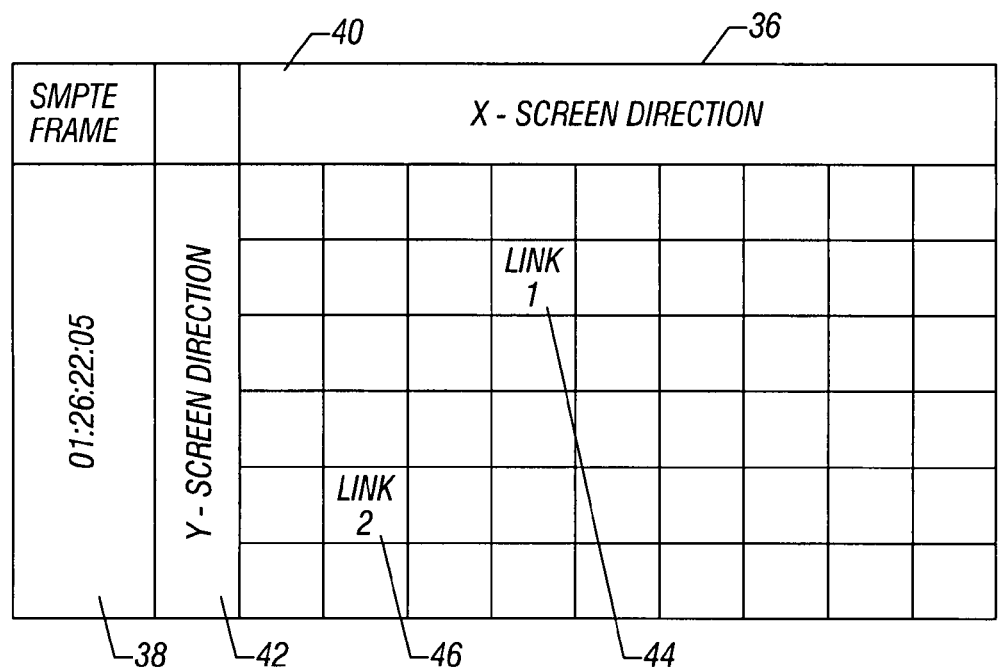
FIG. 4 is a depiction of how a frame may be broken up into distinct locations with embedded links which may be reprogrammed in accordance with one embodiment of the present invention.

A frame 36, illustrated in FIG. 4, may be overlaid by a grid system having an X screen direction 40, a Y screen direction 42 and a frame identifier 38. The frame identifier provides the hours, minutes and seconds indication followed by a 00 to 29 frame number indication. In the embodiment illustrated in FIG. 4, the X and Y screen directions provide rectangular coordinates to identify a plurality of grid segments such as the segments 44 and 46. In this way, every image defined on the frame 36 may be identified by one or more grid coordinates in the X screen and Y screen directions.

Thus, as illustrated in FIG. 4, a given frame 36 may have two embedded links, for example a link 1 and a link 2 associated with the locations 44 and 46. If these locations are selected by the user, they automatically link to additional information which may be stored, for example, on the medium 70 in the embodiment of FIG. 3 or to the link library 75 or content provider 32 via the server 34 in the embodiment of FIG. 2.

While FIG. 4 illustrates an embodiment in which a rectangular grid work is utilized to define locations, any of a variety of location identifying techniques may be utilized. For example, polar coordinates may be utilized, a patchwork of regions may be identified by location numbers, and any of a variety of other indication identifying techniques may be used as well. As another example, one or more display pixels may be associated as a link to additional information.

The user may select a location 44 or 46 using a conventional pointing device such as the RCU 16. When a particular item on the display has a cursor image associated with it, in one embodiment of the present invention, and a mouse button is operated (such as the button associated with the controls 26), that particular location is selected. In response to the selection of a particular location, additional information may be identified. That is, given the particular location in a particular frame, the processor-based system may search for information linked to that particular location in that particular frame.

Thus, in one embodiment of the present invention, the content provider may know that a given location in a given frame is a particular product. When the user selects that location, the user may be provided with additional information, such as video information, about the particular product.

Because of the location system described herein, the linked information may be added or changed at any time. For example, as users continue to select a given location on a given frame, the content provider or other entity may choose to provide additional information in response to repeated requests.

Similarly, the information which is provided may be changed at any time. Because the linked information is not hard coded into the media, the information may be changed in response to the desire to update information, to change sponsorships, or to improve the quality of the information, as examples.

Thus, by providing a system of location identifiers, the need for hard coding of hyperlinks may be avoided. This allows a dynamic system in which the linked information may be varied over time to meet changing needs. In addition, it enables essentially every item in a given video display to be selectively linked to additional information. Moreover, there is no need to adjust the programming of a particular page such as Internet web page, but instead, the desired item can be identified by location.

In the embodiment indicated in FIG. 2, the user selected locations together with the frame identifier may be transmitted back to the server 34 over the back channel 35b to the server. The server 34 may then be responsible for obtaining the linked information for example from the link library 75 or the content provider 32. In this case, the receiver goes outside its own system to obtain the additional information through the link.

In contrast, in the embodiment illustrated in FIG. 3, the linked information may be contained elsewhere on the same media 70 that originally stored the video data. In this case, the additional information may be found entirely within a single processor-based system.

Figure 5:
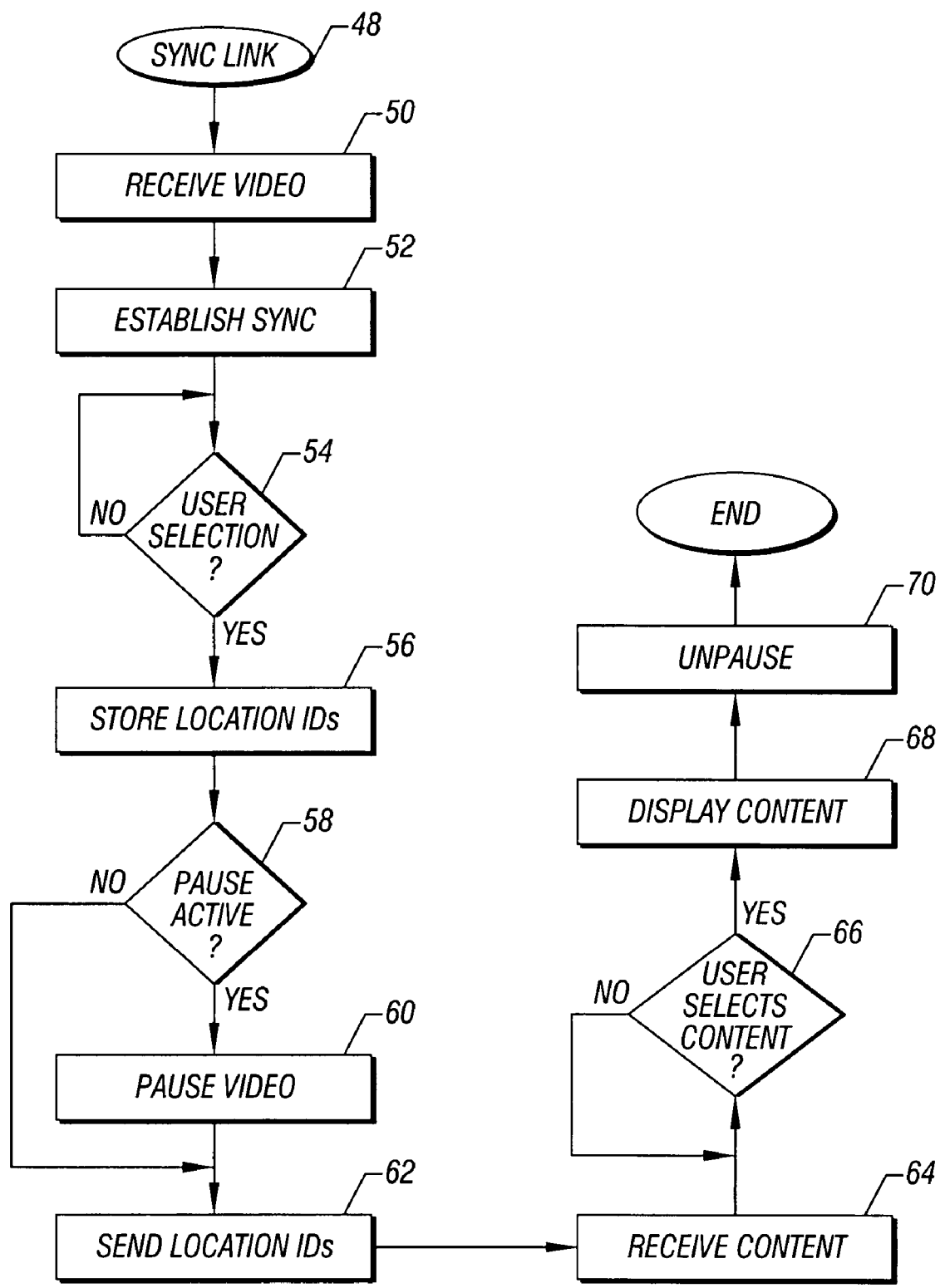
FIG. 5 is a flow chart showing software for implementing one embodiment of the present invention in connection with a client.

The software 48, resident on the receiver 10, may begin by receiving the video data as indicated in block 50 as shown in FIG. 5. The link may be established between that data and the time code system that is utilized by the particular receiver. For example, if the user uses the SMPTE time code system to identify selected locations on selected frames, synchronism of that system is established (block 52).

Next the system awaits a user selection as indicated in diamond 54. The user selection may correspond to the use of a pointing device, such as the RCU 16, to select a particular location on a particular frame. Once the user makes the selection, the location identifiers are stored as indicated in block 56. The location identifiers may identify a particular location in the frame as well as a particular frame. One such identifier is the SMPTE time code.

In some receivers 10, a recording system may be provided wherein data is continuously stored onto a magnetic or optical storage media such as a hard disk drive. When the user wishes to access additional information for viewing, the ongoing video stream may be stored. In systems which use a recording media of the type described, this may be accomplished by pausing the active display, continuing to record the received video, such as a television program, in the background, while displaying additional information selected for access by the user through the linking system described above.

Thus, in these systems, sometimes called broadcast pause and resume systems, with this type of recording media, the pause function may be automatically activated in response to a user selection of a given location on a particular frame. The pause remains in effect until such time as the user has finished viewing the additional information and indicates a desire to return to the ongoing video program. Thus, if the pause is active, as determined in diamond 58, the pause may be automatically instituted for the duration of the excursion into the additional information as indicated in block 60.

Thereafter, the location identifiers are transmitted through a source of video information associated with the link (block 62). Thus, in the embodiment shown in FIG. 2, the location identifiers may be sent outside of the processor-based system 10. In contrast, in the system shown in FIG. 3, the information may be accessed internally of the processor-based system.

The location identifier for the content may be accessed such as a URL or other identifier as indicated in block 64. When the user selects the content as indicated in diamond 66, content may be automatically displayed as indicated in block 68. Again, when the user indicates an intent to resume the original video material returning from the linked information, in systems which use a on-going recording of a received video stream, the system may automatically transition back to display the recorded media (block 70). The system may accelerate through the replay of the recorded media to attempt to return to real time display of the just received video information, as indicated in block 70.

Figure 6:
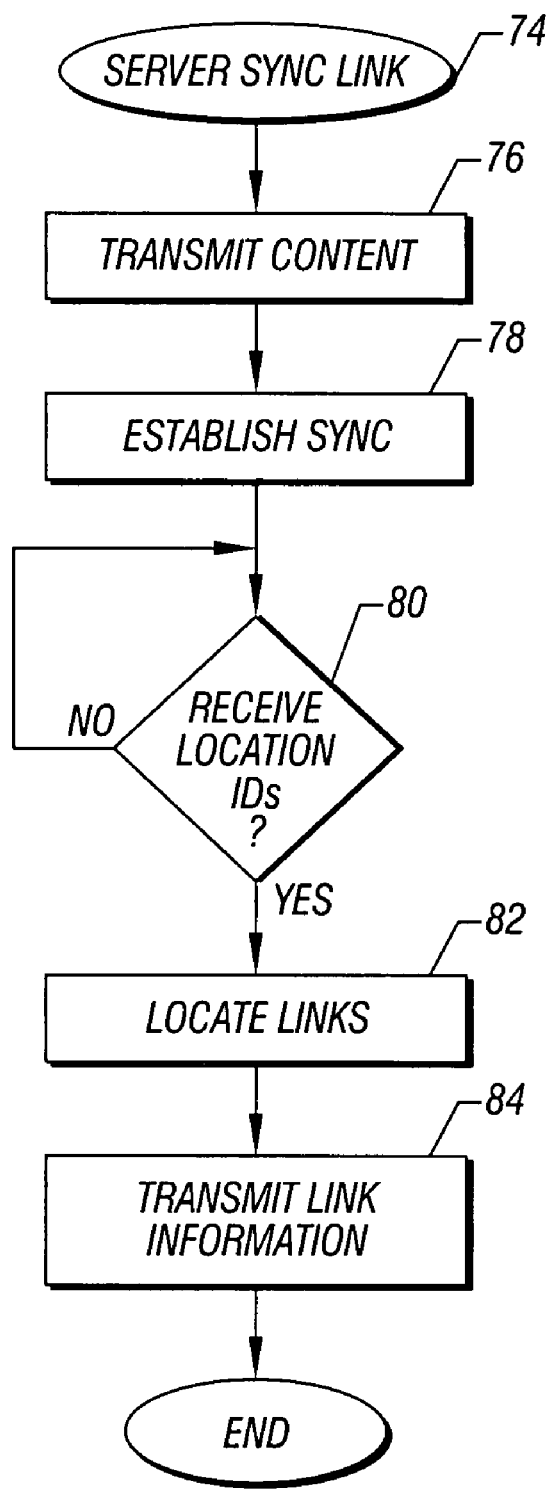
FIG. 6 is a flow chart showing software for implementing one embodiment of the present invention in accordance with a server.

Turning next to FIG. 6, software 74 which may be resident on the server 34, may begin by transmitting video data to one or more receivers as indicated in block 76. Synchronization is established with the receivers as indicated in block 78. When a request for a location identifier is received, as indicated in diamond 80, the requested links may automatically be located as indicated in block 82. Thus, in the embodiment illustrated in FIG. 4, the coordinates of the particular selected location and its frame may be compared to a database containing links for a variety of locations on a variety of frames. When a link is accessed, it can be returned to the receiver. The return link may be a URL or other script that directs the receiver to the source of the information, or the information itself may be provided directly from the server to the receiver as indicated in block 84.

In one embodiment of the invention, the user may cause indicia, such as highlighting, to appear at those locations that are linked to other information. This feature may be activated, for example, during a software set-up sequence.

Figure 7:
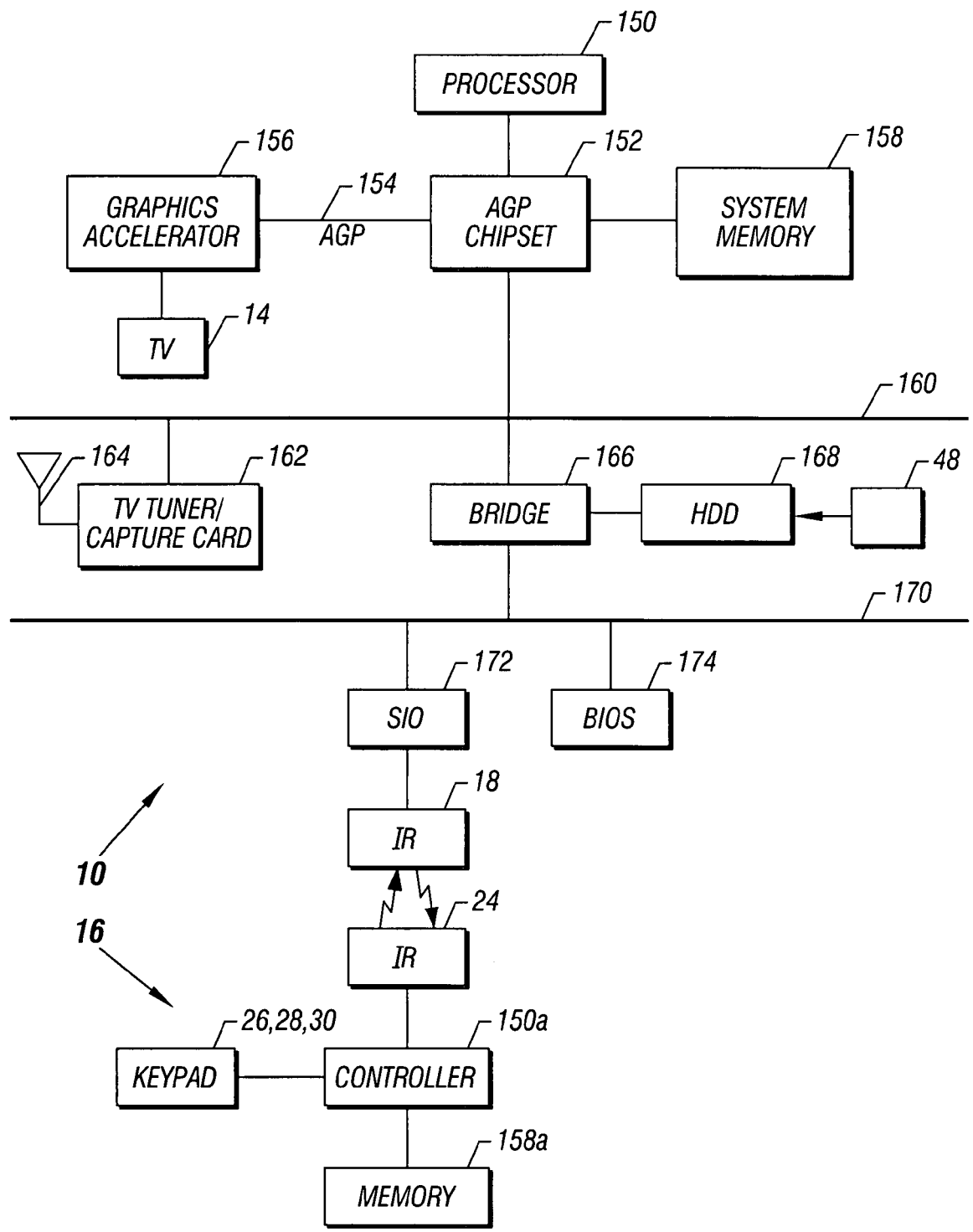
FIG. 7 is a block diagram showing a client in accordance with one embodiment of the present invention.

Finally, referring to FIG. 7, the receiver 10 may include a processor 150 coupled to an accelerated graphics port chipset 152 (see the Accelerated Graphics Port Interface Specification, Revision 1.0, dated Jul. 31, 1996 available from Intel Corporation, Santa Clara, Calif.). The chipset 152 may be coupled to system memory 158 and an AGP port 154. The port 154 communicates with a graphics accelerator 156 and a television receiver 14 in one embodiment of the present invention.

A bus 160, coupled to the chipset 152, also couples a TV tuner/capture card 162 coupled to an appropriate antenna or other transport medium access port 164. A bus 160 also couples a bridge or interface 166 which may communicate with a hard disk drive 168. The software 48 described previously may be stored on the hard disk drive 168. In a broadcast pause and resume system the hard disk drive 168 may be buffered so that it may essentially simultaneously record and playback information in an interleaved or multiplexed series of store and playback sequences.

A second bus 170 may be coupled between the bridge 166 and a serial input/output device (SIO) 172 and a basic input/output system (BIOS) 174. The SIO 172 may communicate with an infrared transceiver 18 which is part of the processor-based unit 12. The transceiver 18 communicates with a transceiver 24 on the RCU 16. The RCU 16 also includes a controller 150a coupled to a memory 158a and the keypad elements 26, 28 and 30.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    selecting other information by accessing a particular location on a frame of video being played back;
    automatically pausing the video playback when the other information is accessed by selecting the particular location on the frame;
    providing the other information while the video playback is paused;
    receiving an indication from a user to resume the playback of the video; and
    automatically resuming the playback of the video when the other information is no longer being accessed,
    wherein selecting the other information by accessing the particular location on the frame of video being played back provides an indication of the focus of the user.

2. The method of claim 1, wherein the focus of the user is an advertisement to be displayed.

3. The method of claim 1, wherein the indication from a user comprises an activation of a play button.

4. The method of claim 1, wherein the other information provides information about a particular product.

5. The method of claim 1, wherein the indication from the user to resume the playback of the video is received via a pointing device.

6. The method of claim 1, further comprising linking to other information on a same medium that stores the frame of video being played back.

7. The method of claim 1, further comprising linking to other information on a different medium that stores the frame of video being played back.

8. The method of claim 1, wherein the other information is located on a web page.

9. A machine-readable storage medium containing instructions which, when executed by a processing system, cause the processing system to perform a method, the method comprising:
    selecting other information by accessing a particular location on a frame of video being played back;
    automatically pausing the video playback when the other information is accessed by selecting the particular location on the frame;
    providing the other information while the video playback is paused;
    receiving an indication from a user to resume the playback of the video; and
    automatically resuming the playback of the video when the other information is no longer being accessed,
    wherein selecting the other information by accessing the particular location on the frame of video being played back provides an indication of the focus of the user.

10. The machine-readable storage medium of claim 9, wherein the focus of the user is an advertisement to be displayed.

11. The machine-readable storage medium of claim 9, wherein the indication from a user comprises an activation of a play button.

12. The machine-readable storage medium of claim 9, wherein the other information provides information about a particular product.

13. An apparatus comprising:
    a client module to play back a frame of video that was previously recorded,
    wherein the client module includes a user interface to allow a user to select more information by accessing a particular location on the frame of video being played back,
    wherein the client module to automatically pause the video playback when the more information is accessed by selecting the particular location on the frame,
    wherein the client module to display the more information while the video playback is paused, and
    wherein the client module to automatically resume the playback of the video from where the video was paused when the more information is no longer being accessed.

14. The apparatus of claim 13, wherein the user to select more information by accessing a particular location on the frame of video includes the user clicking on an icon on the frame of video being played back.

15. The apparatus of claim 13, wherein the frame of video being played back is a commercial.

16. The apparatus of claim 13, wherein the more information and the frame of video being played back are stored on the client module.

17. The apparatus of claim 13, wherein the more information is located on a web page not stored on the client module.

18. A method comprising:
    playing back a frame of video that was previously recorded;
    selecting more information by accessing a particular location on the frame of video being played back;
    automatically pausing the video playback when the more information is accessed by selecting the particular location on the frame;
    displaying the more information while the video playback is paused; and
    automatically resuming the playback of the video from where the video was paused when the more information is no longer being accessed.

19. The method of claim 18, wherein a user to select the more information by clicking on an icon on the frame of video being played back.

20. The method of claim 18, wherein the frame of video being played back is a commercial.

21. The method of claim 18, wherein the more information and the frame of video being played back are stored on the client module.

22. The method of claim 18, wherein the more information is located on a web page.

23. A method comprising:
    causing a symbol to be displayed on a screen, wherein the symbol to indicate information is available that is related to a frame of video being played back;
    allowing a user to indicate a desire to access the information by pressing a first button on a remote control;
    automatically pausing the video playback when the first button is pressed;
    receiving the information via a browser while the video playback is paused;
    allowing the user to indicate a desire to resume the playback of the video by pressing a second button on the remote control; and
    automatically resuming the playback of the video when the second button is pressed.

24. The method of claim 23, wherein the frame of video being played back is a commercial.

25. The method of claim 23, wherein the frame of video being played back is digitally recorded television.

26. The method of claim 23, wherein the screen is a television screen.

27. The method of claim 23, wherein the information is stored on a web site.

28. The method of claim 23, wherein the information is related to a contest.

29. A system comprising:
a client module to cause a display of a symbol on a screen, wherein the symbol to indicate information is available that is related to a frame of video being played back, wherein the client module to allow a user to indicate a desire to access the information by pressing a first button on a remote control, wherein the client module to automatically pause the video playback when the first button is pressed, wherein the client module to receive the information via a browser while the video playback is paused, wherein the client module to allow the user to indicate a desire to resume the playback of the video by pressing a second button on the remote control, and wherein the client module to automatically resuming the playback of the video when the second button is pressed.

30. The system of claim 29, wherein the frame of video being played back is a commercial.

31. The system of claim 29, wherein the frame of video being played back is digitally recorded television.

32. The system of claim 29, wherein the screen is a television screen.

33. The system of claim 29, wherein the information is stored on a web site.

34. The system of claim 29, wherein the information is related to a contest.

\* \* \* \* \*